(12) United States Patent
Harrington et al.

(10) Patent No.: US 7,863,206 B2
(45) Date of Patent: *Jan. 4, 2011

(54) FIBERS AND NON-WOVENS PREPARED WITH PROPYLENE-BASED ELASTOMERS

(75) Inventors: Bruce A. Harrington, Houston, TX (US); Smita Kacker, Houston, TX (US); Vetkav Rajagopalan Eswaran, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 345 days.

This patent is subject to a terminal disclaimer.

(21) Appl. No.: 11/937,882

(22) Filed: Nov. 9, 2007

(65) Prior Publication Data
US 2009/0124154 A1 May 14, 2009

(51) Int. Cl.
*D04H 3/00* (2006.01)

(52) U.S. Cl. .................. 442/329; 442/361; 442/400; 442/401

(58) Field of Classification Search ............ 442/329, 442/361, 400, 401
See application file for complete search history.

(56) References Cited

U.S. PATENT DOCUMENTS

| | | | |
|---|---|---|---|
| 6,218,010 B1 | 4/2001 | Georgellis et al. | |
| 6,342,565 B1 | 1/2002 | Cheng et al. | |
| 6,635,715 B1 | 10/2003 | Datta et al. | |
| 2005/0043489 A1 | 2/2005 | Datta et al. | |
| 2005/0107529 A1 | 5/2005 | Datta et al. | |
| 2009/0124153 A1* | 5/2009 | Dharmarajan et al. | 442/328 |

FOREIGN PATENT DOCUMENTS

EP    0 400 238    5/1990

OTHER PUBLICATIONS

U.S. Appl. No. 11/938,030 filed Nov. 9, 2007 entitled "Fibers and Non-Wovens Prepared with Propylene-Based Elastomers", Inventors: Narayanaswami Raja Dharmarajan et al.
U.S. Appl. No. 11/698,359, filed Jan. 26, 2007 entitled "Fibers and Non-Wovens Prepared with Propylene-Based Elastomers".
U.S. Appl. No. 11/655,399, filed Jan. 19, 2007 entitled "Spunbond Fibers and Fabrics From Polyolefin Blends".
U.S. Appl. No. 11/698,630, filed Jan. 26, 2007 entitled "Elastomeric Non-Wovens".

* cited by examiner

*Primary Examiner*—Lynda Salvatore

(57) ABSTRACT

Nonwoven fabrics and methods for making the same are described, wherein the fabrics comprise two or more propylene-based elastomers in combination with one or more propylene-based thermoplastic polymers. Specifically, the first propylene-based elastomer comprises at least 7% by weight ethylene or non-propylene alpha-olefin units, the second propylene-based elastomer comprises less than 7% by weight ethylene or non-propylene alpha-olefin units, the first and second propylene-based elastomers each have a heat of fusion less than 80 J/g, and the propylene-based thermoplastic polymer has a heat of fusion greater than 80 J/g.

21 Claims, No Drawings

FIBERS AND NON-WOVENS PREPARED WITH PROPYLENE-BASED ELASTOMERS

FIELD OF THE INVENTION

Embodiments of this invention are directed toward fibers and non-wovens prepared from compositions including certain blends of propylene-based elastomers.

BACKGROUND OF THE INVENTION

Propylene-based elastomers, which may also be referred to as semi-amorphous propylene copolymers or crystallizable propylene-based copolymers, have been employed in the manufacture of fibers and non-woven fabrics. These copolymers are often blended with other polymers in the pursuit of desirable properties.

For example, U.S. Publication No. 2005/0107529 teaches fibers prepared from propylene-based elastomers. Examples 1-4 teach the production of fibers from a melt that contains a 20 MFR propylene-ethylene copolymer containing 15 weight percent ethylene together with a propylene homopolymer. The propylene homopolymer is either a 36 MFR homopolymer or a 400 MFR homopolymer. The fibers are formed by employing a conventional fiber spinning line under partially oriented yarn mode. The fibers and non-wovens prepared therefrom can be heat set to provide durable fabrics.

U.S. Pat. No. 6,218,010 teaches an ethylene-propylene copolymer alloy that is suited for making fibers and non-woven spunbond fabrics having softness at economically acceptable processing conditions. The alloy comprises a random copolymer having an ethylene content of from about 1 to about 5% by weight in an amount of from about 40 to about 90% by weight of the alloy; and a second ethylene-propylene copolymer having an ethylene content of from about 5 to about 40% by weight, in an amount of from about 10 to about 60% by weight of the alloy. The copolymer alloys are described to be prepared by a multi-reactor process comprising a first stage of polymerizing a mixture of ethylene and propylene in single or plural reactors, in the presence of a catalyst system capable of randomly incorporating the ethylene monomers and/or alpha-olefin into the macromolecules to form the random copolymer, and a second stage of, in the further presence of the random copolymer containing active catalyst, polymerizing a mixture of ethylene and propylene in single stage or in plural stages to form the second ethylene-propylene copolymer.

U.S. Pat. No. 6,342,565 teaches soft elastic fiber compositions that include a crystallizable propylene copolymer and a crystalline propylene copolymer such as isotactic polypropylene. The fibers may also include a second crystallizable propylene copolymer. The first crystallizable propylene copolymer is characterized by a melting point of less than a 105° C. and a heat of fusion of less than 45 J/g. The crystalline propylene copolymer may be characterized by a melting point above 110° C. and a heat of fusion greater than 60 J/g. Where a second crystallizable propylene copolymer is employed, it may differ from the first crystallizable propylene copolymer in molecular weight and/or crystallinity content.

U.S. Pat. No. 6,635,715 describes blends of a first isotactic polypropylene homopolymer or copolymer component with a second alpha-olefin and propylene copolymer component, wherein the first isotactic polypropylene component has a melting point above about 110° C., and the second copolymer has a melting point between about 25° C. and 105° C. The blends may have from 2 to 95 wt % of the first component and from 98 to 5 wt % of the second copolymer component. In the examples, the polypropylene used is Escorene® 4292, an isotactic polypropylene homopolymer having a nominal melt flow rate (MFR) of 2.0 g/10 min, and the second copolymer is illustrated by an Mw (weight-average molecular weight) of 248,900 to 318,900 and by a Mooney viscosity (ML (1+4) at 125° C. according to ASTM D1646) of from 12.1 to 38.4. The blends are directed to improved mechanical properties of processing, increased tensile strength, elongation, and overall toughness.

SUMMARY OF THE INVENTION

In one or more embodiments, the present invention provides a non-woven fabric made from a composition prepared by combining a first propylene-based elastomer comprising at least 7% by weight mer units derived from ethylene or non-propylene α-olefin, a second propylene-based elastomer comprising less than 7% by weight mer units derived from ethylene or non-propylene alpha-olefin, and a propylene-based thermoplastic polymer, where the first and second polypropylene-based elastomers each have a heat of fusion, as determined by DSC, of less than 80 J/g, and where the propylene-based thermoplastic polymer has a heat of fusion, as determined by DSC, equal to or greater than 80 J/g.

In other embodiments, the present invention provides non-woven fabrics made from a composition prepared by combining a low crystallinity propylene-based elastomer having a peak melt temperature of less than 65° C., a high crystallinity propylene-based elastomer having a peak melt temperature less than 120° C., and a propylene-based thermoplastic polymer, where the first and second propylene-based elastomers each have a heat of fusion, as determined by DSC, of less than 80 J/g, and where the propylene-based thermoplastic polymer has a heat of fusion, as determined by DSC, equal to or greater than 80 J/g.

In other embodiments, the present invention provides a method for forming a non-woven fabric, the method comprising extruding a propylene-rich composition into fibers and optionally weaving and bonding the fibers, where the propylene-rich composition is prepared by: combining a solution comprising a first propylene-based elastomer with a solution comprising a second propylene-based elastomer to form a blended solution of the first propylene-based elastomer and the second propylene-based elastomer; combining the blend of the first and second propylene-based elastomers with a propylene-based thermoplastic polymer to form a propylene-rich composition; and optionally vis-breaking the propylene-rich composition, where the first propylene-based elastomer comprises at least 7% by weight mer units derived from ethylene or non-propylene α-olefin, where the second propylene-based elastomer comprises less than 7% mer units derived from ethylene or non-propylene α-olefin, and where the first and second polypropylene-based elastomers each have a heat of fusion, as determined by DSC, of less than 80 J/g, and where the propylene-based thermoplastic polymer has a heat of fusion, as determined by DSC, equal to or greater than 80 J/g.

DETAILED DESCRIPTION OF ILLUSTRATIVE EMBODIMENTS

According to one or more embodiments of the present invention, fibers and/or non-woven fabrics are prepared from compositions that include a (i) a low crystallinity propylene-based elastomer, (ii) a high crystallinity propylene-based elastomer, and (iii) a propylene-based thermoplastic resin. In particular embodiments, the fibers and non-woven fabrics are prepared by employing spunbonding techniques. The fibers and non-woven fabrics can be used in composite constructions.

Low Crystallinity Propylene-Based Elastomer

In one or more embodiments, the low crystallinity propylene-based elastomer, which may also be referred to as low crystallinity copolymer or simply LCPE, comprise units (i.e., mer units) derived from propylene, one or more comonomer units derived from ethylene or C4 to C20 α-olefins, and optionally one or more comonomer units derived from dienes. In one or more embodiments, the α-olefin comonomer units may derive from, for example, ethylene, 1-butene, 1-hexane, 4-methyl-1-pentene and/or 1-octene. In one or more embodiments, the diene comonomer units may derive from 5-ethylidene-2-norbornene, 5-vinyl-2-norbornene, divinyl benzene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, dicyclopentadiene, or a combination thereof. The embodiments described below are discussed with reference to ethylene as the α-olefin comonomer, but the embodiments are equally applicable to other low crystallinity copolymers with other α-olefin comonomers. As used herein, the term copolymer is meant to include any polymer comprising two or more monomers.

In one or more embodiments, the LCPE may comprise at least 7 wt %, in other embodiments at least 8 wt %, in other embodiments at least 9 wt %, and in other embodiments at least 10 wt % ethylene-derived units; in these or other embodiments, the copolymers may comprise up to 25 wt %, in other embodiments up to 22 wt %, in other embodiments up to 20 wt %, and in other embodiments up to 18 wt % ethylene-derived units, where the percentage by weight is based upon the total weight of the propylene-derived and α-olefin derived units. In these or other embodiments, the LCPE may comprise at least 75 wt %, or in other embodiments at least 78 wt %, propylene-derived units; and in these or other embodiments, the copolymers may comprise up to 80 wt %, in other embodiments up to 82 wt %, in other embodiments up to 93 wt %, and in other embodiments up to 90 wt % propylene-derived units, where the percentage by weight is based upon the total weight of the propylene-derived and α-olefin derived units. In particular embodiments, the LCPE may comprise diene-derived units. For example, the LCPE may have diene-derived mer units in an amount from about 0.5 wt % up to about 5 wt % of the total polymer.

The ethylene content may be measured as follows for a copolymer having an ethylene content up to 40 wt % ethylene. A thin homogeneous film is pressed according to sub-method A of ASTM D-3900. It is then mounted on a Perkin Elmer Spectrum 2000 infrared spectrophotometer. A full spectrum is recorded using the following parameters: Resolution: 4.0 $cm^{-1}$, Spectral Range: 4500 to 450 $cm^{-1}$. Ethylene content is determined by taking the ratio of the propylene band area at 1155 $cm^{-1}$ to the ethylene band area at 732 $cm^{-1}$ ($C_3/C_2$=AR) and applying it to the following equation: Wt % Ethylene=$73.492-89.298X+15.637X^2$, where X=AR/(AR+1) and AR is the peak area ratio (1155 $cm^{-1}$/722 $cm^{-1}$).

The LCPE of one or more embodiments may have a broad melting transition as determined by differential scanning calorimetry (DSC) and may have more than one maxima point. The melting point, or melt temperature, ($T_m$) discussed here refers to the highest temperature at which a maxima in heat absorption within the range of melting of the sample occurs.

In one or more embodiments, the $T_m$ of the LCPE (as determined by DSC) is less than 65° C., and in other embodiments less than 60° C. In one or more embodiments, the LCPE does not exhibit any melting transition peak or maxima point above 65° C.

In one or more embodiments, the LCPE may be characterized by a heat of fusion ($H_f$), as determined by DSC. In one or more embodiments, the LCPE may be characterized by an $H_f$ that is at least 0.5 J/g, in other embodiments at least 1.0 J/g, in other embodiments at least 1.5 J/g, in other embodiments at least 3.0 J/g, in other embodiments at least 4.0 J/g, in other embodiments at least 6.0 J/g, and in other embodiments at least 7.0 J/g. In these or other embodiments, LCPE may be characterized by an $H_f$ of less than 50 J/g, in other embodiments less than 48 J/g, in other embodiments less than 45 J/g, in other embodiments less than 50 J/g, in other embodiments less than 40 J/g, in other embodiments less than 35 J/g, and in other embodiments less than 30 J/g. Crystallinity may be determined by dividing the heat of fusion of a sample by the heat of fusion of a 100% crystalline polymer, which is assumed to be 189 J/g for isotactic polypropylene.

As used within this specification, DSC procedures for determining $T_m$ and $H_f$ are as follows. The polymer is pressed at a temperature of from about 200° C. to about 230° C. in a heated press, and the resulting polymer sheet is hung, under ambient conditions, in the air to cool. About 6 to 10 mg of the polymer sheet is removed with a punch die. This 6 to 10 mg sample is annealed at room temperature for about 80 to 100 hours. At the end of this period, the sample is placed in a Differential Scanning Calorimeter (Perkin Elmer Pyris One Thermal Analysis System) and cooled to about −50° C. to about −70° C. The sample is heated at 10° C./min to attain a final temperature of about 200° C. The sample is kept at 200° C. for 5 minutes and a second cool-heat cycle is performed. Events from both cycles are recorded. The thermal output is recorded as the area under the melting peak of the sample, which typically occurs between about 0° C. and about 200° C. It is measured in Joules and is a measure of the heat of fusion (Hf) of the polymer. The $T_m$ discussed here refers to the highest temperature at which a maxima in heat absorption within the range of melting of the sample occurs with respect to a baseline assigned by the calorimeter. This might also be typically the temperature of the greatest heat absorption within the range of melting of the sample.

The LCPE can have a triad tacticity of three propylene units, as measured by $^{13}$C NMR, of 75% or greater, 80% or greater, 82% or greater, 85% or greater, or 90% or greater. In one or more embodiments, ranges include from about 50 to about 99%, in other embodiments from about 60 to about 99%, in other embodiments from about 75 to about 99%, in other embodiments from about 80 to about 99%, and in other embodiments from about 60 to about 97%. Triad tacticity is determined by the methods described in U.S. Patent Application Publication No. 2004/0236042.

In one or more embodiments, the LCPE has a narrow compositional distribution (CD). This intermolecular composition distribution of the copolymer can be determined by thermal fractionation in a solvent, such as hexane or heptane, as follows. Approximately 75% by weight (more preferably 85% by weight) of the polymer is isolated as one or two adjacent soluble fractions with the balance of the copolymer in immediately preceding or succeeding fractions. In order for the copolymer to have a narrow compositional distribution as discussed above, each of the isolated fractions will generally have a composition (wt % ethylene content) with a difference of no greater than 20 wt % (relative) or in other embodiments no greater than 10 wt % (relative) from the average wt % ethylene content of the entire second polymer component.

In one or more embodiments, the LCPE can have a melt flow rate (MFR), as measured according to ASTM D-1238, 2.16 kg weight @ 230° C., of at least 0.5 dg/min, in other embodiments at least 1.0 dg/min, and in other embodiments at least 1.5 dg/min. In these or other embodiments, the melt flow rate may be less than 180 dg/min, and in other embodiments less than 150 dg/min. In an embodiment, the LCPE has an MFR of 8 dg/min to 70 dg/min, in other embodiments from 9 dg/min to 65 dg/min, and in other embodiments from 10 dg/min to 60 dg/min. In another embodiment, the LCPE has an MFR of 70 dg/min to 200 dg/min, in other embodiments from 75 dg/min to 180 dg/min, and in other embodiments from 80 dg/min to 150 dg/min.

In one or more embodiments, the LCPE can have a weight average molecular weight ($M_w$) of about 5 to about 5,000 kg/mole, in other embodiments a $M_w$ of about 10 to about 1,000 kg/mole, in other embodiments a $M_w$ of about 20 to about 500 kg/mole, and in other embodiments a $M_w$ of about 50 to about 400 kg/mole.

In one or more embodiments, the LCPE can have a number average molecular weight ($M_n$) of about 2.5 to about 2,500 kg/mole, in other embodiments a $M_n$ of about 5 to about 500 kg/mole, in other embodiments a $M_n$ of about 10 to about 250 kg/mole, and in other embodiments a $M_n$ of about 25 to about 200 kg/mole.

In one or more embodiments, the molecular weight distribution index (MWD=($M_w/M_n$)) of the LCPE may be about 1 to about 40, in other embodiments about 1 to about 5, in other embodiments about 1.8 to about 5, and in other embodiments about 1.8 to about 3.

Techniques for determining the molecular weight ($M_n$, $M_w$) and molecular weight distribution (MWD) may be found in U.S. Pat. No. 4,540,753 (Cozewith, Ju and Verstrate) (which is incorporated by reference herein for purposes of U.S. practices), and references cited therein, and in Macromolecules, 1988, volume 21, p 3360 (Verstrate et al.), which is herein incorporated by reference for purposes of U.S. practices, and references cited therein. For example, molecular weight may be determined by size exclusion chromatography (SEC) by using a Waters 150 gel permeation chromatograph equipped with a differential refractive index detector and calibrated using polystyrene standards.

The LCPE may be prepared by known techniques for preparing propylene-based elastomers. In this regard, reference can be made to U.S. Pat. Nos. 6,525,157, 6,982,310, 6,992,158, 6,992,159, and 6,992,160. In particular embodiments, the HCPE and the LCPE can be prepared together to form a blend or mixture by employing a series or parallel synthetic technique as will be later described.

High Crystallinity Propylene-Based Elastomer

In one or more embodiments, the high crystallinity propylene-based elastomer, which may also be referred to as high crystallinity copolymer or simply HCPE, comprises units (i.e., mer units) derived from propylene, one or more comonomer units derived from ethylene or C4 to C20 α-olefins, and optionally one or more comonomer units derived from dienes. In one or more embodiments, the α-olefin comonomer units may derive from, for example, ethylene, 1-butene, 1-hexene, 4-methyl-1-pentene and/or 1-octene. In one or more embodiments, the diene comonomer units may derive from 5-ethylidene-2-norbornene, 5-vinyl-2-norbornene, divinyl benzene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, dicyclopentadiene, or a combination thereof. The embodiments described below are discussed with reference to ethylene as the α-olefin comonomer, but the embodiments are equally applicable to other low crystallinity copolymers with other α-olefin comonomers.

In one or more embodiments, the HCPE may include at least 2 wt %, in other embodiments at least 3 wt %, and in other embodiments at least 4 wt % ethylene-derived units; in these or other embodiments, the copolymers may include less than 7 wt %, in other embodiments less than 6 wt %, and in other embodiments less than 5 wt % ethylene-derived units, where the percentage by weight is based upon the total weight of the propylene-derived and α-olefin derived units. In these or other embodiments, the HCPE may include at least 94 wt %, or in other embodiments at least 95 wt %, propylene-derived units; and in these or other embodiments, the copolymers may include up to 98 wt %, in other embodiments up to 97 wt %, and in other embodiments up to 96 wt % propylene-derived units, where the percentage by weight is based upon the total weight of the propylene-derived and α-olefin derived units. In particular embodiments, the HCPE may include diene-derived units. For example, the HCPE may have diene-derived mer units in an amount of from about 0.5 wt % to 5 wt % of the total polymer.

The HCPE of one or more embodiments may have a broad melting temperature as determined by differential scanning calorimetry (DSC). The HCPE may show secondary melting peaks in addition to the principal peak. The $T_m$ discussed here refers to the highest temperature at which a maxima in heat absorption within the range of melting of the sample occurs relative to a baseline assigned by the calorimeter. This might also be typically the temperature of the greatest heat absorption within the range of melting of the sample.

In one or more embodiments, the HCPE includes at least one melting transition peak or maxima above 65° C. In one or more embodiments, the $T_m$ of the HCPE (as determined by DSC) is less than 120° C., in other embodiments less than 110° C., in other embodiments less than 100° C., and in other embodiments less than 95° C.

In one or more embodiments, the HCPE may be characterized by an $H_f$, as determined by DSC. In one or more embodiments, the HCPE may have a heat of fusion that is at least 10 J/g, in other embodiments at least 20 J/g, in other embodiments at least 25 J/g, in other embodiments at least 30 J/g, in other embodiments at least 50 J/g, in other embodiments at least 55 J/g, and in other embodiments at least 60 J/g. In these or other embodiments, the HCPE may have a heat of fusion of less than 80 J/g, in other embodiments less than 75 J/g, and in other embodiments less than 70 J/g. Crystallinity may be determined by dividing the $H_f$ of a sample by the heat of fusion of a 100% crystalline polymer, which is assumed to be 189 J/g for isotactic polypropylene.

The HCPE may have a triad tacticity of three propylene units, as measured by $^{13}C$ NMR, of 75% or greater, 80% or greater, 82% or greater, 85% or greater, or 90% or greater. In one or more embodiments, triad tacticity ranges include from about 50 to about 99%, in other embodiments from about 60 to about 99%, in other embodiments from about 75 to about 99%, in other embodiments from about 80 to about 99%, and in other embodiments from about 60 to about 97%. Triad tacticity is determined by the methods described in U.S. Patent Application Publication No. 2004/0236042.

In one or more embodiments, the HCPE may have a narrow compositional distribution (CD). This intermolecular composition distribution of the polymer is determined by thermal fractionation in a solvent such as hexane or heptane. This thermal fractionation procedure is generally as follows. Typically, approximately 75% by weight and more preferably 85% by weight of the polymer is isolated as one or two adjacent soluble fractions with the balance of the polymer in immediately preceding or succeeding fractions. In order for the copolymer to have a narrow compositional distribution as discussed above, each of the isolated fractions will generally have a composition (wt % ethylene content) with a difference of no greater than 20 wt % or in other embodiments no greater than 10 wt % relative to the average wt % ethylene content of the entire second polymer component.

In one or more embodiments, the HCPE can have an MFR, as measured according to ASTM D-1238, 2.16 kg weight @ 230° C., of at least 0.5 dg/min, in other embodiments at least 1.0 dg/min, and in other embodiments at least 1.5 dg/min. In these or other embodiments, the melt flow rate may be less than 180 dg/min, and in other embodiments less than 150 dg/min. In an embodiment, the HCPE has an MFR of 8 dg/min to 70 dg/min, in other embodiments from 9 dg/min to 65 dg/min, and in other embodiments from 10 dg/min to 60 dg/min. In another embodiment, the HCPE has MFR of 70 dg/min to 200 dg/min, in other embodiments from 75 dg/min to 180 dg/min, and in other embodiments from 80 dg/min to 150 dg/min.

In one or more embodiments, the HCPE may have a weight average molecular weight ($M_w$) of about 5 to about 5,000 kg/mole, in other embodiments of about 10 to about 1,000 kg/mole, in other embodiments of about 20 to about 500 kg/mole, and in other embodiments of about 50 to about 400 kg/mole.

In one or more embodiments, the HCPE can have a number average molecular weight ($M_n$) of about 2.5 to about 2,500 kg/mole, in other embodiments of about 5 to about 500 kg/mole, in other embodiments of about 10 to about 250 kg/mole, and in other embodiments of about 25 to about 200 kg/mole.

In one or more embodiments, the molecular weight distribution index (MWD=($M_w/M_n$)) of the HCPE may be from about 1 to about 40, in other embodiments from about 1 to about 5, in other embodiments from about 1.8 to about 5, and in other embodiments from about 1.8 to about 3.

The HCPE may be prepared by using techniques known for preparing propylene-based elastomers including those set forth above for the LCPE, making adjustments as necessary for ethylene content, as is well within the ability of one skilled in the art. In particular embodiments, the HCPE and the LCPE may be prepared together to form a blend or mixture by employing a series or parallel synthetic technique.

Propylene-Based Thermoplastic

Propylene-based thermoplastic resins, which may also be referred to as propylene-based thermoplastic polymers, include those polymers that primarily comprise units derived from the polymerization of propylene. In certain embodiments, at least 98% of the units of the propylene-based thermoplastic polymer derive from the polymerization of propylene. In particular embodiments, these polymers include homopolymers of propylene.

In certain embodiments, the propylene-based thermoplastic polymers may also include units derived from the polymerization of ethylene and/or α-olefins such as 1-butene, 1-hexene, 1-octene, 2-methyl-1-propene, 3-methyl-1-pentene, 4-methyl-1-pentene, 5-methyl-1-hexene, and mixtures thereof. Specifically included are reactor, impact, and random copolymers of propylene with ethylene or the higher α-olefins, described above, or with $C_{10}$-$C_{20}$ diolefins.

In one or more embodiments, the propylene-based thermoplastic polymers may have a $T_m$ that is greater than 120° C., in other embodiments greater than 155° C., and in other embodiments greater than 160° C. In these or other embodiments, the propylene-based thermoplastic polymers may have a $T_m$ that is less than 180° C., in other embodiments less than 170° C., and in other embodiments less than 165° C.

In one or more embodiments, the propylene-based thermoplastic polymers may have an $H_f$ that is equal to or greater than 80 J/g, in other embodiments greater than 100 J/g, in other embodiments greater than 125 J/g, and in other embodiments greater than 140 J/g as measured by DSC.

In one or more embodiments, propylene-based thermoplastic polymers may include crystalline and semi-crystalline polymers. In one or more embodiments, these polymers may be characterized by a crystallinity of at least 40% by weight, in other embodiments at least 55% by weight, in other embodiments at least 65%, and in other embodiments at least 70% by weight as determined by DSC. Crystallinity may be determined by dividing the heat of fusion of a sample by the heat of fusion of a 100% crystalline polymer, which is assumed to be 189 J/g for isotactic polypropylene.

In general, the propylene-based thermoplastic polymers may be synthesized having a broad range of molecular weight and/or may be characterized by a broad range of MFR. For example, the propylene-based thermoplastic polymers can have an MFR of at least 2 dg/min, in other embodiments at least 4 dg/min, in other embodiments at least 6 dg/min, and in other embodiments at least 10 dg/min, where the MFR is measured according to ASTM D-1238, 2.16 kg @ 230° C. In these or other embodiments, the propylene-based thermoplastic polymer can have an MFR of less than 2,000 dg/min, in other embodiments less than 400 dg/min, in other embodiments less than 250 dg/min, in other embodiments less than 100 dg/min, and in other embodiments less than 50 dg/min, where the MFR is measured according to ASTM D-1238, 2.16 kg @ 230° C.

In one or more embodiments, the propylene-based thermoplastic polymers may have an $M_w$ of from about 50 to about 2,000 kg/mole, and in other embodiments from about 100 to about 600 kg/mole. They may also have an $M_n$ of from about 25 to about 1,000 kg/mole, and in other embodiments from about 50 to about 300 kg/mole, as measured by GPC with polystyrene standards.

In one embodiment, the propylene-based thermoplastic polymers include a homopolymer of a high-crystallinity isotactic or syndiotactic polypropylene. This polypropylene can have a density of from about 0.85 to about 0.91 g/cc, with the largely isotactic polypropylene having a density of from about 0.90 to about 0.91 g/cc. In one or more embodiments, the propylene based thermoplastic polymer includes isotactic polypropylene having a bimodal molecular weight distribution.

The propylene-based thermoplastic polymers may be synthesized by any appropriate polymerization technique known in the art such as, for example, slurry, gas phase, or solution, using catalyst systems such as conventional Ziegler-Natta catalysts or other single-site organometallic catalysts like metallocenes, or non-metallocenes.

Other Additives

The blends of this invention may also comprise other ingredients. For example, the blends of this invention may comprise nucleating agents, which can be present at 50 to 4000 ppm based on total polymer in the blend composition. Nucleating agents include, for example, sodium benzoate and talc. Also, other nucleating agents may also be employed, such as Ziegler-Natta olefin products or other highly crystalline polymers. Nucleating agents include Hyperform (such as HPN-68) and Millad additives (e.g., Millad 3988) (Milliken Chemicals, Spartanburg, S.C.) and organophosphates like NA-11 and NA-21 (Amfine Chemicals, Allendale, N.J.).

Further, a variety of additives may be incorporated into the embodiments described above used to make the blends, fibers, and fabrics for various purposes. Other additives include, for example, stabilizers, antioxidants, fillers, and slip aids. Primary and secondary antioxidants include, for example, hindered phenols, hindered amines, and phosphites. Other additives such as dispersing agents, for example, Acrowax C, can also be included. Catalyst deactivators may also be used including, for example, calcium stearate, hydrotalcite, and calcium oxide, and/or other acid neutralizers known in the art.

In one or more embodiments, useful slip aids include those compounds or molecules that are incompatible with the polymeric matrix of the fibers (i.e., the propylene-based elastomers and/or propylene-based thermoplastic resins and/or feel modifiers) and therefore migrate to the surface of the fiber. In one or more embodiments, the slip aids form a monolayer over the surface (or a portion thereof) of the fiber. In these or other embodiments, useful slip aids are characterized by relatively low molecular weight, which can facilitate migration to the surface. Types of slip aids include fatty acid amides as disclosed in *Handbook of Antiblocking, Release and Slip Additives*, George Wypych, Page 23. Examples of fatty acid amides include, but are not limited to, behenamide, erucamide, N-(2-hdriethyl) erucamide, Lauramide, N,N'-ethylene-bis-oleamide, N,N'-ethylene bisstearmide, oleamide, oleyl palmitamide, stearyl erucamide, tallow amide, and mixtures thereof.

Other additives include, for example, fire/flame retardants, plasticizers, vulcanizing or curative agents, vulcanizing or curative accelerators, cure retarders, processing aids, and the like. The aforementioned additives may also include fillers and/or reinforcing materials, either added independently or incorporated into an additive. Examples include carbon black, clay, talc, calcium carbonate, mica, silica, silicate, combinations thereof, and the like. Other additives which may be employed to enhance properties include antiblocking agents or lubricants.

In yet other embodiments, isoparaffins, polyalphaolefins, polybutenes, or a mixture of two or more thereof may also be added to the compositions of the invention. Polyalphaolefins may include those described in WO 2004/014998, particularly those described at page 17, line 19 to page 19, line 25. These polyalphaolefins may be added in amounts such as about 0.5 to about 40% by weight, in other embodiments from about 1 to about 20% weight, and in other embodiments from about 2 to about 10% by weight.

Amounts

In one or more embodiments, the compositions of this invention may include at least 5 wt %, in other embodiments at least 10 wt %, and in other embodiments at least 20 wt % propylene-based elastomer (i.e., both low crystallinity and high crystallinity elastomers) based upon the total weight of the composition. In these or other embodiments, the compositions may include less than 95 wt %, in other embodiments less than 90 wt %, and in other embodiments less than 80 wt % propylene-based elastomer based upon the total weight of the composition.

In one or more embodiments, the compositions of the present invention may include at least 70 wt %, in other embodiments at least 75 wt %, and in other embodiments at least 80 wt % LCPE based upon the total weight of the LCPE and HCPE. In these or other embodiments, the compositions may include less than 98 wt %, in other embodiments less than 95 wt %, and in other embodiments less than 90 wt % LCPE based upon the total weight of the LCPE and HCPE.

In one or more embodiments, the compositions of the present invention may include at least 2 wt %, in other embodiments at least 5 wt %, and in other embodiments at least 10 wt % HCPE based upon the total weight of the LCPE and HCPE. In these or other embodiments, the compositions may include less than 30 wt %, in other embodiments less than 25 wt %, and in other embodiments less than 20 wt % HCPE based upon the total weight of the LCPE and HCPE.

In one or more embodiments, the compositions of this invention may include at least 5 wt %, in other embodiments at least 10 wt %, and in other embodiments at least 20 wt % propylene-based thermoplastic resin based upon the total weight of the composition. In these or other embodiments, the compositions may include less than 95 wt %, in other embodiments less than 90 wt %, and in other embodiments less than 80% wt % propylene-based thermoplastic resin based upon the total weight of the composition.

Preparing the Composition

The compositions employed to make the fibers and/or fabrics of one or more embodiments of this invention may be prepared by employing several techniques. The HCPE, LCPE, and propylene-based thermoplastic resin may be introduced and blended by any procedure that causes an intimate admixture of the components. For example, they may be blended in a tumbler, static mixer, batch mixer, extruder, or a combination thereof. In these or other embodiments, the mixing may take place as part of a processing method used to fabricate the fibers. In other embodiments, an internal mixer may be employed for melt blending; for example, the components can be blended at 180° C. to 240° C. in a Brabender Plastograph for 1 to 20 minutes. In yet other embodiments, the polymers can be blended in a Banbury internal mixer above the flux temperature of the polymers (e.g., about 180° C.) for about 5 minutes. In yet other embodiments, a continuous mixer may be employed, including those well known in the art such as twin-screw mixing extruders, static mixers for mixing molten polymer streams of low viscosity, impingement mixers, and the like. In another embodiment, the propylene-based elastomer and the propylene-based thermoplastic resin can be treated with peroxide in the melt to tailor the viscosity of the polymer to a higher melt flow rate. As is known in the art, this reduction in MFR may be referred to as "vis-breaking".

The addition or introduction of the additional ingredients to the blend may take place by using methods similar to those employed to form the initial blend. In particular embodiments, the additional ingredients are added as part of the fiber forming process.

In one or more embodiments, the HCPE and the LCPE may be first introduced, and then the propylene-based thermoplastic resin may be subsequently introduced to the blend of the HCPE and LCPE. In one or more embodiments, blends of the HCPE and the LCPE may be formed by blending solutions of the LCPE and HCPE prepared in separate series or parallel polymerization stages. The blended solutions may then be desolventized, and the blended polymer may then be blended with the thermoplastic polymer in the solid state (e.g., molten mixing).

In one or more embodiments, the LCPE may be produced in a first reactor. An effluent from the first reactor, containing a solution of the LCPE may be transferred to a second reactor where a catalyst and monomers necessary to produce the HCPE are contacted, so that a solution of the HCPE is produced in the presence of the LCPE. This is referred to as a series reactor process.

In other embodiments, both the LCPE and the HCPE may be produced in solution polymerization reactors. Combining the solutions of the polymeric components resulting from these processes provides an intimate blending of the LCPE and HCPE during polymerization of the HCPE. The blended polymers may then be withdrawn from the second reactor and processed into polymer particles using conventional processing equipment and techniques.

Alternatively, the HCPE may be produced in the first reactor in series with the second reactor. Effluent from the first reactor, containing a solution of the HCPE, is then transferred to the second reactor where the LCPE is produced in the presence of the HCPE, followed by processing the resultant blended polymers into polymer pellets.

In parallel polymerization processes, the LCPE and the HCPE are produced in parallel reactors with effluents from each reactor, containing solutions of the respective polymer, directed to a device for blending the effluents to produce a solution of blended polymer components. The blended polymers are then recovered from the solution and processed into polymer particles in accordance with conventional process equipment and techniques.

In embodiments in which the HCPE is produced in the first polymerization stage, since a low commoner content in the HCPE may be desirable, additional comonomer can be added to the second polymerization stage to produce the desired LCPE in the second polymerization stage.

In embodiments that involve parallel reactor configuration, the HCPE can be made in either reactor. The two reactors may have independent temperature, pressure, and feed controls such that product blend properties can be tailored independently.

In other embodiments, pellets of the HCPE and LCPE may be dissolved in respective solutions, and the solutions may be subsequently blended with one another.

Fiber and Fabric Formation

The formation of non-woven fabrics from the foregoing compositions may include manufacture of fibers by extrusion followed by weaving or bonding. The extrusion process may be accompanied by mechanical or aerodynamic drawing of the fibers. The fiber and fabrics of the present invention may be manufactured by any technique and/or equipment known in the art, many of which are well known. For example, spunbond non-woven fabrics may be produced by spunbond non-woven production lines produced by Reifenhauser GmbH & Co., of Troisdorf, Germany. The Reifenhasuer system utilizes a slot drawing technique as described in U.S. Pat. No. 4,820,142.

Conventional Fine Denier Fibers

In one or more embodiments, fibers may be produced by continuous filament, bulked continuous filament, or staple fiber-formation techniques. For example, the polymer melt may be extruded through the holes in the die (spinneret), which may, for example, be between 0.3 mm and 0.8 mm in diameter. Low melt viscosity of the polymer may be achieved through the use of high melt temperature (e.g., 230° C. to 280° C.) and high melt flow rates (e.g., 15 g/10 min to 40 g/10 min) of the polymers used. A relatively large extruder may be equipped with a manifold to distribute a high output of molten polymer to a bank of from about eight to about twenty spinnerets. Each spinhead may be equipped with a separate gear pump to regulate output through that spinhead; a filter pack, supported by a "breaker plate"; and the spinneret plate within the head. The number of holes in the spinneret plate determines the number of filaments in a yarn and varies considerably with different yarn constructions, but it is typically in the range of from about 50 to about 250. The holes can be grouped into round, annular, or rectangular patterns to assist in good distribution of the quench air flow.

Continuous Filaments

Continuous filament yarns can range from about 40 denier to about 2,000 denier (denier=number of grams/9000 meter). Filaments generally range from 1 to 20 denier per filament (dpf), although larger ranges are contemplated. Spinning speeds may include 800 m/min to 1500 m/min (2500 ft/min to 5000 ft/min). An exemplary method would proceed as follows. The filaments are drawn at draw ratios of 3:1 or more (one- or two-stage draw) and wound onto a package. Two-stage drawing allows higher draw ratios to be achieved. Winding speeds are generally from 2,000 m/min to 3,500 m/min (6,600 ft/min to 11,500 ft/min). Spinning speeds in excess of 900 m/min (3000 ft/min) may require a narrow molecular weight distribution to get the best spinnability with the finer filaments, such as for example resins with a minimum MFR of 5 and a polydispersity index (PI) under 2.8. In slower spinning processes, or in heavier denier filaments, a 16-MFR reactor grade product may be more appropriate.

Partially Oriental Yarn (POY)

Partially oriented yarn (POY) is the fiber produced directly from fiber spinning without solid state drawing (as continuous filament mentioned above). The orientation of the molecules in the fiber is done only in the melt state just after the molten polymer leaves the spinneret. Once the fiber is solidified, no drawing of the fiber takes place and the fiber is wounded up into a package. The POY yarn (as opposed to fully oriented yarn, or FOY, which has gone through solid state orientation and has a higher tensile strength and lower elongation) tends to have a higher elongation and lower tenacity.

Bulked Continuous Filament

Bulked continuous filament fabrication processes fall into two basic types, one-step and two-step. For example, in a two-step process, an undrawn yarn is spun at less than 1,000 m/min (3,300 ft/min), usually 750 m/min, and placed on a package. The yarn is drawn (usually in two stages) and "bulked" on a machine called a texturizer. Winding and drawing speeds are limited by the bulking or texturizing device to typically 2,500 m/min (8,200 ft/min) or less. As in the two-step CF process, secondary crystallization requires prompt draw texturizing. Common processes include one-step spin/draw/text (SDT) processes. This process may provide better economics, efficiency and quality than the two-step process. They are similar to the one-step CF process, except that the bulking device is in-line. Bulk or texture may change yarn appearance, separating filaments and adding enough gentle bends and folds to make the yarn appear fatter (bulkier).

Staple Fiber

Fiber fabrication processes include two processes: traditional and compact spinning. The traditional process typically involves two steps: i) producing, applying finish, and winding followed by ii) drawing, a secondary finish application, crimping, and cutting into staple. Filaments can range, for example, from 1.5 dpf to >70 dpf, depending on the application. Staple length can be as short as 7 mm or as long as 200 mm (0.25 in. to 8 in.) to suit the application. For many applications, the fibers are crimped. Crimping is accomplished by over-feeding the tow into a steam-heated stuffer box with a pair of nip rolls. The over-feed folds the tow in the box, forming bends or crimps in the filaments. These bends may be heat-set by steam injected into the box. The MW, MWD, and isotactic content of the resin can affect crimp stability, amplitude, and ease of crimping.

Melt Blown Fabrics

Melt blown fabrics may refer to webs of fine filaments having fiber diameter in the range of 20 to 0.1 microns. Fiber diameters of melt blown fibers may be, in some embodiments, in the range of 1 to 10 microns, or in other embodiments from 1 to about 5 microns. The non-woven webs formed by these fine fiber diameters have very small pore sizes and therefore may have excellent barrier properties. For example, in the melt blown process, the extruder melts the polymer and delivers it to a metering melt pump. The melt pump delivers the molten polymer at a steady output rate to the special melt blowing die. As the molten polymer exits the die, it is contacted by high temperature, high velocity air (called process or primary air). This air rapidly draws and, in combination with the quench air, solidifies the filaments. The entire fiber forming process typically takes place within several inches of the die. Die design can be important to producing a quality product efficiently. The fabric is formed by blowing the filaments directly onto a porous forming belt, typically 200 mm to 400 mm (8 in. to 15 in.) from the spinnerets. A larger forming distance may be used for heavier basis weight, higher loft product. Melt blowing may require very high melt flow rate resins such as those greater than 200 g/10 min, to obtain the finest possible fibers, although resin MFR as low as 20 g/10 min can be used at a higher processing temperature in other embodiments.

Spunbonded Fabric

Spunbond or spunbonded fibers include fibers produced, for example, by the extrusion of molten polymer from either a large spinneret having several thousand holes or with banks of smaller spinnerets containing for example as few as 40 holes. After exiting the spinneret, the molten fibers are quenched by a cross-flow air quench system, then pulled away from the spinneret and attenuated (drawn) by high speed air. There are generally two methods of air attenuation, both of which use the venturi effect. The first draws the filament using an aspirator slot (slot draw), which may run the width of the spinneret or the width of the machine. The second method draws the filaments through a nozzle or aspirator gun. Filaments formed in this manner may be collected on a screen ("wire") or porous forming belt to form the web. The web can then be passed through compression rolls and then between heated calendar rolls where the raised lands on one roll bond the web at points covering, for example, 10% to 40% of its area to form a non-woven fabric. In another embodiment, welding of the fibers can also be effected using convection or radiative heat. In yet another embodiment, fiber welding can be effected through friction by using hydro entangling or needle punch methods.

Annealing may be done after the formation of fiber in continuous filament or fabrication of a non-woven material from the fibers. Annealing may partially relieve the internal stress in the stretched fiber and restore the elastic recovery properties of the blend in the fiber. Annealing has been shown to lead to significant changes in the internal organization of the crystalline structure and the relative ordering of the amorphous and semicrystalline phases. This may lead to recovery of the elastic properties. For example, annealing the fiber at a temperature of at least 40° C., above room temperature (but slightly below the crystalline melting point of the blend), may be adequate for the restoration of the elastic properties in the fiber.

Thermal annealing of the fibers can be conducted by maintaining the fibers (or fabrics made from the fibers) at temperatures, for example, between room temperature up to 160° C., or alternatively to a maximum of 130° C. for a period between a few seconds to less than 1 hour. A typical annealing period is 1 to 5 minutes at about 100° C. The annealing time and temperature can be adjusted based upon the composition employed. In other embodiments, the annealing temperature ranges from 60° C. to 130° C. In another embodiment, the temperature is about 100° C.

In certain embodiments, for example conventional continuous fiber spinning, annealing can be done by passing the fiber through a heated roll (godet) without the application of conventional annealing techniques. Annealing may desirably be accomplished under very low fiber tension to allow shrinking of the fiber in order to impart elasticity to the fiber. In non-woven processes, the web usually passes through a calender to point bond (consolidate) the web. The passage of the unconsolidated non-woven web through a heated calender at relatively high temperature may be sufficient to anneal the fiber and increase the elasticity of the non-woven web. Similar to fiber annealing, the non-woven web may desirably be formed under low tension to allow for shrinkage of the web in both machine direction (MD) and cross direction (CD) to enhance the elasticity of the non-woven web. In other embodiments, the bonding calender roll temperature ranges from 100° C. to 130° C. In another embodiment, the temperature is about 100° C. The annealing temperature can be adjusted for any particular blend.

The elastic nonwoven fabrics described herein may further be used in constructing composite laminate structures in multi-beam spunmelt process. It is common for industrial spunmelt processes to have a combination of spunbond (S) and meltblown beams (M). Some common configurations for laminate structures are SS, SSS, SSS, SMS, SMMS, SSMMS, etc. The spunbond and meltblown beams can also possess bi-component capability, so that fibers from two different polymers can be formed to have either a core-sheath type configuration or a side-by-side configuration. In the core sheath arrangement, the core can be composed of an elastic fiber, while the sheath may be composed of crystalline polyolefins (such as polypropylene or polyethylene) to provide a soft touch. In the side-by-side configuration, fibers from both polymers are exposed to the surface.

One example of the use of elastic nonwoven fabrics in such structures is in an SMMS process, where the outer S substrates may be bi-component webs with an elastic nonwoven on the inside and a polyolefin having a low coefficient of friction as the sheath layer. The M layers may be, for example, specialty propylene-based elastomers, crystalline polyolefins, and/or blends thereof. Both the propylene-based elastomers and the crystalline polyolefins can individually be blends of low and high molecular weight resins. Another example is an SSMMS construction, wherein the outer S substrate may be a bi-component stretch laminate (for example, PE sheath/PP core), the inner S may be an elastic nonwoven web, the meltblown (M) layers may comprise one or more crystalline polyolefins (PP, PE), propylene-based elastomers, and blends thereof, and the outer S layer may comprise a bi-component web with an elastic nonwoven core and a polyolefin sheath. The elastic nonwovens may further be modified by any suitable additives known to those skilled in the art, such as titanium dioxide to improve opacity.

INDUSTRIAL APPLICABILITY

The fibers and non-woven fabrics of the present invention may be employed in several applications. In one or more embodiments, they may be advantageously employed in diapers and/or similar personal hygiene articles, for example in such applications as diaper tabs, side panels, leg cuffs, top sheet, back sheet, tapes, feminine hygiene articles, swim pants, infant pull up pants, incontinence wear components, and bandages. In particular, they can be employed as the dynamic or stretchable components of these articles such as, but not limited to, the elastic fastening bands. In other embodiments, the fibers and non-woven fabrics may be fabricated into other protective garments or covers such as medical gowns or aprons, surgical drapes, sterilization wraps, wipes, bedding, or similar disposable garments and covers. These materials may also find applications in protective covers, home furnishing such as bedding, carpet antiskid padding, wall coverings, floor coverings, window shades, scrims, and any other application in which traditional fabrics have been used previously.

In other embodiments, the fibers and fabrics of the present of the present invention can be employed in the manufacture of filtration media (gas and liquid). For example, particular applications include use in functionalized resins where the non-woven fabric can be electrostatically charged to form an electret.

Further, the fibers and fabrics of the present invention may be employed in any of the structures and other end-use applications, or in conjunction with any of the additives and other compositions described in U.S. patent application Ser. Nos. 11/698,359; 11/655,399; and 11/698,630, which are incorporated herein by reference in their entirety to the extent permitted.

Certain specific embodiments of the invention include those described in the following paragraphs preceding the examples:

A non-woven fabric made from a composition prepared by combining: a first propylene-based elastomer comprising at least 7% by weight mer units derived from ethylene or non-propylene α-olefin, a second propylene-based elastomer comprising less than 7% by weight mer units derived from ethylene or non-propylene alpha-olefin, and a propylene-based thermoplastic polymer, where the first and second polypropylene-based elastomers each have a heat of fusion, as determined by DSC, of less than 80 J/g, and where the propylene-based thermoplastic polymer has a heat of fusion, as determined by DSC, equal to or greater than 80 J/g.

The embodiments of the preceding paragraph, where the first propylene-based elastomer comprises at least 8% by weight mer units derived from ethylene or non-propylene α-olefin and where the second propylene-based elastomer comprises less than or equal to 6% by weight mer units derived from ethylene or non-propylene α-olefin.

The embodiments of any of the preceding paragraphs, where said first propylene-based elastomer comprises at least 15 and less than 20% by weight mer units derived from ethylene or non-propylene α-olefin and where said second propylene-based elastomer comprises at least 3 to less than 6% by weight mer units derived from ethylene or non-propylene α-olefin.

The embodiments of any of the preceding paragraphs, where the first propylene-based elastomer has an MFR (ASTM D-1238 2.16. kg at 230° C.) of from about 10 to 60, where said second propylene-based elastomer has an MFR (ASTM D-1238 2.16 kg @230° C.) of 10 to about 60 dg/min, and where the propylene-based thermoplastic polymer has an MFR (ASTM D-1238 2.16 kg @230° C.) of about 3 to about 60 dg/min.

The embodiments of any of the preceding paragraphs, where the first propylene-based elastomer has an MFR (ASTM D-1238 2.16. kg at 230° C.) of from about 10 to 60 dg/min, where said second propylene-based elastomer has an MFR (ASTM D-1238 2.16 kg @230° C.) of 10 to about 60 dg/min, and where the propylene-based thermoplastic polymer has an MFR (ASTM D-1238 2.16 kg @230° C.) of about 20 to about 40 dg/min.

The embodiments of any of the preceding paragraphs, where the first propylene-based elastomer has an MFR (ASTM D-1238 2.16. kg at 230° C.) of from about 80 to 150 dg/min, where said second propylene-based elastomer has an MFR (ASTM D-1238 2.16 kg @230° C.) of 80 to about 180 dg/min, and where the propylene-based thermoplastic polymer has an MFR (ASTM D-1238 2.16 kg @230° C.) of about 3 to about 1,500 dg/min.

The embodiments of any of the preceding paragraphs, where the first propylene-based elastomer has an MFR (ASTM D-1238 2.16. kg at 230° C.) of from about 80 to 150 dg/min, where said second propylene-based elastomer has an MFR (ASTM D-1238 2.16 kg @230° C.) of 80 to about 150 dg/min, and where the propylene-based thermoplastic polymer has an MFR (ASTM D-1238 2.16 kg @230° C.) of about 20 to about 40 dg/min.

The embodiments of any of the preceding paragraphs, where the first propylene-based elastomer has an MFR (ASTM D-1238 2.16. kg at 230° C.) of from about 80 to 150 dg/min, where said second propylene-based elastomer has an MFR (ASTM D-1238 2.16 kg @230° C.) of 80 to about 150 dg/min, and where the propylene-based thermoplastic polymer has an MFR (ASTM D-1238 2.16 kg @230° C.) of about 100 to about 1,500 dg/min.

The embodiments of any of the preceding paragraphs, where the composition has been vis-broken and has an MFR (ASTM D-1238 2.16 @ 230° C.) of about 60 to about 90 dg/min.

The embodiments of any of the preceding paragraphs, where the composition has been vis-broken and has an MFR (ASTM D-1238 2.16 @ 230° c.) of about 150 to about 350 dg/min.

The embodiments of any of the preceding paragraphs, where the non-woven fabric has an elongation in the cross-machine direction of at least 80% or higher.

A non-woven fabric made from a composition prepared by combining a low crystallinity propylene-based elastomer having a peak melt temperature of less than 65° C., a high crystallinity propylene-based elastomer having a peak melt temperature less than 120° C., and a propylene-based thermoplastic polymer, where the first and second propylene-based elastomers each have a heat of fusion, as determined by DSC, of less than 80 J/g, and where the propylene-based thermoplastic polymer has a heat of fusion, as determined by DSC, equal to or greater than 80 J/g.

The embodiment of the preceding paragraph, where the low crystallinity propylene-based elastomer has an MFR (ASTM D-1238 2.16. kg at 230° C.) of from about 10 to 60 dg/min, where the high crystallinity propylene-based elastomer has an MFR (ASTM D-1238 2.16 kg @230° C.) of 10 to about 60 dg/min, and where the propylene-based thermoplastic polymer has an MFR (ASTM D-1238 2.16 kg @230° C.) of about 3 to about 60 dg/min.

The embodiments of any of the preceding paragraphs, where the low crystallinity propylene-based elastomer has an MFR (ASTM D-1238 2.16. kg at 230° C.) of from about 10 to 60 dg/min, where the high crystallinity propylene-based elastomer has an MFR (ASTM D-1238 2.16 kg @230° C.) of 10 to about 60 dg/min, and where the propylene-based thermoplastic polymer has an MFR (ASTM D-1238 2.16 kg @230° C.) of about 20 to about 40 dg/min.

The embodiments of any of the preceding paragraphs, where the low crystallinity propylene-based elastomer has an MFR (ASTM D-1238 2.16. kg at 230° C.) of from about 80 to 150 dg/min, where said high crystallinity propylene-based elastomer has an MFR (ASTM D-1238 2.16 kg @230° C.) of 80 to about 180 dg/min, and where the propylene-based thermoplastic polymer has an MFR (ASTM D-1238 2.16 kg @230° C.) of about 3 to about 1,500 dg/min.

The embodiments of any of the preceding paragraphs, where the low crystallinity propylene-based elastomer has an MFR (ASTM D-1238 2.16. kg at 230° C.) of from about 80 to 150 dg/min, where the high crystallinity propylene-based elastomer has an MFR (ASTM D-1238 2.16 kg @230° C.) of 80 to about 150 dg/min, and where the propylene-based thermoplastic polymer has an MFR (ASTM D-1238 2.16 kg @230° C.) of about 20 to about 40 dg/min.

The embodiments of any of the preceding paragraphs, where the low crystallinity propylene-based elastomer has an MFR (ASTM D-1238 2.16. kg at 230° C.) of from about 80 to 150 dg/min, where said high crystallinity propylene-based elastomer has an MFR (ASTM D-1238 2.16 kg @230° C.) of 80 to about 150 dg/min, and where the propylene-based thermoplastic polymer has an MFR (ASTM D-1238 2.16 kg @230° C.) of about 100 to about 1,500 dg/min.

The embodiments of any of the preceding paragraphs, where the composition has been vis-broken and has an MFR ASTM D-1238 2.16 @ 230° C.) of about 60 to about 90 dg/min.

The embodiments of any of the preceding paragraphs, where the non-woven fabric of claim 12, where the composition has been vis-broken and has an MFR ASTM D-1238 2.16 @ 230° C.) of about 150 to about 350 dg/min.

The embodiments of any of the preceding paragraphs, where the non-woven fabric has an elongation in the cross-machine direction of at least 80% or higher.

A method for forming a non-woven fabric, the method comprising extruding a propylene-rich composition into fibers and optionally weaving and bonding the fibers, where the propylene-rich composition is prepared by combining a solution comprising a first propylene-based elastomer with a solution including a second propylene-based elastomer to form a blended solution of the first propylene-based elastomer and the second propylene-based elastomer; combining the blend of the first and second propylene-based elastomers with a propylene-based thermoplastic polymer to form a propylene-rich composition; and optionally vis-breaking the propylene-rich composition, where the first propylene-based elastomer comprises at least 7% by weight mer units derived from ethylene or non-propylene α-olefin, where the second propylene-based elastomer comprises less than 7% mer units derived from ethylene or non-propylene α-olefin, and where the first and second polypropylene-based elastomers each have a heat of fusion, as determined by DSC, of less than 80 J/g, and where the propylene-based thermoplastic polymer has a heat of fusion, as determined by DSC, equal to or greater than 80 J/g.

In order to demonstrate the practice of the present invention, the following examples have been prepared and tested. The examples should not, however, be viewed as limiting the scope of the invention. The claims will serve to define the invention, and any modifications within the scope of the claims that would be recognized by persons skilled in the art are also considered to be part of the invention.

EXAMPLES

Blends of LCPE and HCPE were prepared by blending solutions of LCPE and HCPE polymerized in parallel solution polymerization processes using a metallocene catalyst. The ethylene content of the respective LCPE and HCPE are provided in Table I.

TABLE I

| | LCPE | | | HCPE | | |
|---|---|---|---|---|---|---|
| PE Blend | Ethylene Wt % | MFR | Wt % | Ethylene Wt % | MFR | Wt % |
| PE1 | 16 | 20 | 90 | 5 | 20 | 10 |
| PE2 | 16 | 90 | 90 | 5 | 90 | 10 |
| PE3 | 16 | 20 | 80 | 10 | 20 | 20 |

After annealing for four days, PE1 was determined to have a melt temperature (Tm) transition ranging from 48° C. to 94° C. and a heat of fusion ($H_f$) of 12 J/g, using the DSC procedure described previously. PE1 has a typical MFR value (ASTM 1238, 230 C, 2.16 Kg) of 20 dg/min with an MWD (by GPC as corrected by LALLS) of 2.3, an $M_w$ of 138,000 g/mole, and an $M_n$ of 64,000 g/mole.

In the following samples, pellets of the respective blends were blended with various amounts of polypropylene homopolymer pellets. Alternatively, the respective pelletized blends were blended with a polypropylene homopolymer and an organic dialkyl peroxide (2,5-dimethyl-2,5-di(t-butylperoxy)hexane), available commercially as Luperox 101 (Arkema Inc), to vis-break the blend to a desired MFR.

The polypropylene homopolymers employed in these samples were characterized as follows. PP1, which is commercially available as PP3155 (ExxonMobil), had a $T_m$ of 166° C., an $H_f$ of 98 J/g (first heat cycle), an MFR of 36 dg/min, and an MWD of less than 3.0. PP2 was obtained commercially as PP3505 (ExxonMobil) and had an MFR of about 400. PP3 was prepared by starting with PP1 and vis-breaking the same to an MFR of about 800 dg/min. PP4 was obtained commercially as PP3746G (ExxonMobil) and was coated with peroxide for a target MFR of 1500 dg/min.

Blending was performed in a single screw Davis Extruder having an L:D ratio of 24/1, equipped with an underwater pelletizer. A temperature profile typical of polypropylene blends, i.e., from 220° C. to 250° C., was maintained with a production rate of 50 lbs/hr (22.7 kg/hr). The compositions of the resulting blends are shown in Table II.

TABLE II

| Sample | Type of Copolymer | Type of PP | Amount PP (wt. %) | Amount Peroxide (ppm) | Ethylene Wt % | Blend MFR (g/10 min) |
|---|---|---|---|---|---|---|
| A1 | PE1 | PP1 | 10 | 700 | 13.5 | 83.9 |
| A2 | PE1 | PP1 | 15 | 700 | 11.9 | 84.1 |
| A3 | PE3 | PP1 | 10 | 700 | 13.1 | 86.6 |
| A4 | PE3 | PP1 | 15 | 700 | 12.3 | 85.3 |
| A5 | PE2 | PP1 | 10 | NONE | 13.8 | 82 |
| A6 | PE2 | PP1 | 15 | NONE | 13.2 | 82.3 |
| A7 | PE2 | PP2 | 15 | NONE | — | 132 |
| A8 | PE2 | PP3 | 15 | NONE | — | 137 |
| A9 | PE2 | PP4 | 15 | NONE | — | 147 |

TABLE II-continued

| Sample | Type of Copolymer | Type of PP | Amount PP (wt. %) | Amount Peroxide (ppm) | Ethylene Wt % | Blend MFR (g/10 min) |
|---|---|---|---|---|---|---|
| A10 | PE1 | PP1 | 75 | — | — | — |
| A11 | PE1 | PP1 | 60 | — | — | — |
| A12 | PE1 | PP1 | 15 | 2200 | 12.77 | 203.8 |
| A13 | PE1 | PP1 | 15 | 2300 | 12.98 | 272.1 |
| A14 | PE1 | PP1 | 10 | 2000 | 13.62 | 202 |

Samples A1-A6

Spunbond fabric trials were conducted on a Reicofil™ line (made by the Reifenhauser Company, Germany) located at TANDEC spinbonding facilities at the University of Tennessee in Knoxville, Tenn. The single screw extruder size was 70 mm with a 30:1 L/D (length:diameter) ratio. The spinneret had 4036 die plate holes, each with a diameter of 0.6 mm. Continuous fibers were extruded onto an endless belt and then bonded to each other using heated calendar rolls, one plain and the other bearing a pattern of raised points. The actual bonded area represented about 14.5% of the total web surface area. Resins were run at a temperature of 215° C. at the die with quench air at 12° C.-13° C. The calendar rolls were maintained at 82° C.-91° C. with minimum nip pressure. As used in the Tables below, the abbreviation GHM means grams of polymer per hole per minute, and GSM means grams per square foot, given as $g/ft^2$ ($g/cm^2$). The fabric 'formation' (uniformity of distribution of fibers in the fabric) was observed to be satisfactory for all of the blend example fabrics. The process conditions for the fabric formation are set forth in Table III.

TABLE III

| Run No. | Sample | Output, GHM | Basis Wt., g/m² | Blower rpm | Suction rpm | Fiber Dia, (µm) | Std. Dev. Fiber Dia % |
|---|---|---|---|---|---|---|---|
| 1 | A3 | 0.2 | 71.2 | 2700 | 2100 | 18.96 | 11 |
| 2 | A3 | 0.4 | 70.2 | 2800 | 2100 | 23 | 5 |
| 3 | A4 | 0.2 | 69.7 | 2700 | 2100 | 16.06 | 8 |
| 4 | A4 | 0.4 | 70.8 | 2860 | 2300 | 19.79 | 5 |
| 5 | A1 | 0.2 | 71.4 | 2700 | 2100 | 19.48 | 11 |
| 6 | A1 | 0.4 | 70.1 | 2700 | 2100 | 24.51 | 11 |
| 7 | A2 | 0.2 | 67.5 | 2530 | 2040 | 15.31 | 9 |
| 8 | A5 | 0.2 | 56 | 1827 | 1379 | 16.02 | 2 |
| 9 | A5 | 0.2 | 69.8 | 1817 | 1379 | 18.58 | 4 |
| 10 | A5 | 0.4 | 68 | 2310 | 1830 | 23.17 | 4 |
| 11 | A5 | 0.4 | 78 | 2310 | 1830 | 23.26 | 2 |
| 12 | A6 | 0.2 | 45 | 1470 | 1161 | 17.16 | 1 |
| 13 | A6 | 0.2 | 69.3 | 1470 | 1161 | 16.21 | 2 |
| 14 | A6 | 0.4 | 69.1 | 2036 | 1491 | 23.18 | 2 |

The tensile properties of the fabrics resulting from samples A1-A6 are shown in Table IV. Measurements were made both in the machine direction (MD) and the cross-machine direction (CD), also known as the transverse direction (TD). As used herein, the Peak Force (Peak Load) and Peak Elongation of a fiber or non-woven sample, (including a fabric) were measured according to ASTM D-5035-95 (2003) unless otherwise mentioned, on a 50 mm (2") wide and 250 mm long specimen, with 200 mm gage length at a crosshead speed of 100 mm/min. Six MD and six TD measurements instead of five MD and eight TD measurements were made for each specimen.

TABLE IV

| Run No. | Resin ID | Peak Load MD (N) | Elongation MD (%) | Peak Load TD (N) | Elongation TD (%) |
|---|---|---|---|---|---|
| 1 | A3 | 32.71 | 167 | 22.72 | 246 |
| 2 | A3 | 19.91 | 206 | 13.7 | 241 |
| 3 | A4 | 54.74 | 133 | 35.88 | 193 |
| 4 | A4 | 32.07 | 176 | 23.23 | 205 |
| 5 | A1 | 35.2 | 162 | 22.63 | 228 |
| 6 | A1 | 20.48 | 219 | 13.74 | 231 |
| 7 | A2 | 58.49 | 124 | 36.08 | 174 |
| 8 | A5 | 23.17 | 150 | 16.53 | 170 |
| 9 | A5 | 16.95 | 141 | 13.35 | 174 |
| 10 | A5 | 14.05 | 181 | 12.42 | 198 |
| 11 | A5 | 19.09 | 191 | 12.93 | 197 |
| 12 | A6 | 31.50 | 141 | 25.36 | 165 |
| 13 | A6 | 16.15 | 108 | 15.36 | 129 |
| 14 | A6 | 17.90 | 148 | 18.74 | 155 |

The elastic properties of the fabrics resulting from Samples A1-A4 are shown in Table V. Hysteresis of the samples was measured on an Instron Instrument with a 5.08 cm grip. Specimens sized 61 cm by 213 cm were used with a gage length of 7.6 cm and a crosshead speed of 50.8 cm/min. A 3-cycle test was done to 100% elongation without repositioning the fabric between cycles. Definitions: 1) Load loss at 50%=100×(load-up-load-down)/load-up; 2) Permanent set=Elongation at which load equals zero in the down cycle, expressed in %.

TABLE V

| | Sample | | | |
|---|---|---|---|---|
| | A4 | A2 | A3 | A1 |
| Run | Run 3 | Run 7 | Run 1 | Run 5 |
| Direction | MD | MD | MD | MD |
| Permanent Set, (%) Cycle 1 | 18.9 | 24.5 | 12.8 | 13.5 |

TABLE V-continued

| | Sample | | | |
|---|---|---|---|---|
| | A4 | A2 | A3 | A1 |
| Permanent Set, (%)Cycle 2 | 20.6 | 24.8 | 13.8 | 15.2 |
| Load Loss 50% (%) Cycle 1 | 92.6 | 94.7 | 83.4 | 87.2 |
| Load Loss 50% (%) Cycle 1 | 71.4 | 76.8 | 53.5 | 58.5 |
| Direction | TD | TD | TD | TD |
| Permanent Set, (%) Cycle 1 | 20.7 | 24.5 | 13.7 | 14.4 |
| Permanent Set, (%)Cycle 2 | 21.0 | 25.5 | 14.1 | 14.8 |
| Load Loss 50% (%) Cycle 1 | 92.0 | 94.1 | 79.6 | 83.5 |
| Load Loss 50% (%)Cycle 1 | 71.8 | 76.6 | 47.6 | 52.9 |

Samples A7-A9

Using similar procedures to those provided in samples A1-A6, additional fibers were prepared from samples A7-A9. For each of the runs 6-12, the compositions were modified by adding 2 wt % of a masterbatch including 30 wt % Erucamide and 70 wt % Vistamaxx™ 2125 (ExxonMobil). The process conditions that were employed are set forth in Table VI.

TABLE VI

| Run No. | Sample | Output, GHM | Basis Wt., g/m² | Blower rpm | Suction rpm | Fiber Dia, (μm) |
|---|---|---|---|---|---|---|
| 1 | A7 | 0.2 | 69.5 | 2402 | 1792 | 17.7 |
| 2 | A7 | 0.4 | 70.3 | 2645 | 1992 | 17.7 |
| 3 | A8 | 0.2 | 70 | 2411 | 1694 | 17.7 |
| 4 | A8 | 0.4 | 70 | 2529 | 1968 | 22.3 |
| 5 | A9 | 0.2 | 67.1 | 2418 | 1814 | 16.8 |
| 6 | A9 | 0.2 | 69.2 | 2415 | 1814 | 18.1 |
| 7 | A9 | 0.4 | 70 | 2730 | 2160 | 21.6 |
| 8 | A9 | 0.2 | 47 | 2412 | 1815 | 15.7 |
| 9 | A9 | 0.2 | 37.5 | 2412 | 1815 | 16.6 |
| 10 | A9 | 0.2 | 23.7 | 2412 | 1815 | 15.9 |
| 11 | A9 | 0.2 | 19.9 | 2412 | 1815 | 16.7 |
| 12 | A9 | 0.2 | 17 | 2412 | 1815 | 15.0 |

The tensile properties resulting from samples A7-A9 are shown in Table VII, which were obtained using procedures similar to those set forth for samples A1-A6.

TABLE VII

| Run No. | Resin ID | Peak Load MD (N) | Elongation MD (%) | Peak Load TD (N) | Elongation TD (%) |
|---|---|---|---|---|---|
| 1 | A7 | 27.4 | 200 | 20.0 | 263 |
| 2 | A7 | 15.6 | 250 | 12.2 | 281 |
| 3 | A8 | 19.4 | 211 | 14.2 | 259 |
| 4 | A8 | 10.6 | 259 | 8.0 | 264 |
| 5 | A9 | 23.3 | 198 | 16.1 | 235 |
| 6 | A9 | 24.9 | 213 | 16.5 | 285 |
| 7 | A9 | 10.8 | 247 | 9.1 | 352 |
| 8 | A9 | 15.8 | 216 | 13.0 | 251 |
| 9 | A9 | 12.2 | 178 | 8.4 | 224 |
| 10 | A9 | 6.8 | 162 | 4.4 | 195 |
| 11 | A9 | 5.8 | 160 | 3.3 | 174 |
| 12 | A9 | 3.6 | 154 | 2.8 | 177 |

The elastic properties of the fabrics resulting from samples A7-A9 are shown in Table VIII, and were obtained using similar procedures set forth above for Samples A1-A6.

TABLE VIII

| | Run | | | |
|---|---|---|---|---|
| | 1 | 3 | 5 | 6 |
| Sample | A7 | A8 | A9 | A9 |
| Direction | MD | MD | MD | MD |
| Cycle 1 | | | | |
| Load Loss (%) at 50% | 81.6 | 75.6 | 81.3 | 83.4 |
| Permanent Set, % | 13.5 | 14.2 | 14.0 | 17.1 |
| Cycle 2 | | | | |
| Load Loss (%) at 50% | 48.8 | 43.1 | 51.7 | 57.5 |
| Permanent Set, % | 13.8 | 16.4 | 16.9 | 18.6 |
| Cycle 3 | | | | |
| Load Loss (%) at 50% | 43.9 | 43.7 | 48.0 | 56.3 |
| Permanent Set (%) | 13.7 | 15.3 | 15.5 | 18.5 |

Samples A10-A11

Using similar procedures to those provided in Samples A1-A6, additional fibers were prepared from Samples A10-A11 except that the calendar rolls were maintained at 130-132° C., and the calendar nip pressure was set at 282-288 pounds per linear inch for 25 GSM fabrics and at 530-550 pounds per linear inch for 50 GSM fabrics. The process conditions employed for each run are set forth in Table IX.

TABLE IX

| Run No. | Sample | Output GHM | Basis Wt., g/m² | Blower rpm | Suction rpm | Fiber Dia, (μm) | Std. Dev. Fiber Dia % |
|---|---|---|---|---|---|---|---|
| 1 | A10 | 0.2 | 25 | 1569 | 1550 | 15.5 | 7 |
| 2 | A10 | 0.2 | 49.6 | 1569 | 1550 | 15.7 | 6 |
| 3 | A10 | 0.4 | 25 | 1839 | 1839 | 18.9 | 5 |
| 4 | A10 | 0.4 | 50 | 2089 | 2048 | 18.3 | 5 |
| 5 | A11 | 0.2 | 24.6 | 1647 | 1909 | 14.1 | 6 |
| 6 | A11 | 0.2 | 50.2 | 1646 | 1891 | 13.7 | 4 |
| 7 | A11 | 0.4 | 25.2 | 2093 | 2312 | 16.3 | 5 |
| 8 | A11 | 0.4 | 50.7 | 2093 | 2312 | 16.5 | 6 |

The tensile properties of the fabrics resulting from Samples A10-A11 are shown in Table X. The Peak Force (Peak Load) and Peak Elongation were measured according to the ASTM test D-5035-95 (2003) with four modifications: (1) the jaw width was 5 inch instead of 3 inch, (2) test speed was 5 in/min instead of 12 in/min, (3) metallic arc-type upper line grip and a flat lower rubber grip were used instead of a flat metallic upper and flat metallic lower grip, and (4) 6 MD and 6 TD measurements instead of 5 MD and 8 TD measurements were made for each specimen. Hand was measured on a Thwing-Albert Handle-O-Meter (10 mm slot width).

TABLE X

| Run No. | Sample | Peak Load MD (lb) | Elongation MD (%) | Peak Load TD (lb) | Elongation TD (%) | Hand, gm |
|---|---|---|---|---|---|---|
| 1 | A10 | 6.6 | 63 | 4.7 | 81 | 9.5 |
| 2 | A10 | 15.6 | 100 | 10.5 | 111 | 33.6 |
| 3 | A10 | 3.7 | 57 | 3.0 | 62 | — |
| 4 | A10 | 10.8 | 83 | 9.2 | 97 | — |
| 5 | A11 | 5.2 | 56 | 3.8 | 69 | 9.3 |
| 6 | A11 | 12.7 | 78 | 9.3 | 91 | 22 |
| 7 | A11 | 2.4 | 53 | 2.1 | 54 | — |
| 8 | A11 | 9.6 | 87 | 8.5 | 101 | — |

Samples A12-A14

Using similar procedures to those provided for Samples A1-A6, additional fibers were prepared from Samples A12-A14. Fiber formation was generally accomplished in a similar manner except that melt and air temperatures were set at 249° C. The suction blower was set at 2000 rpm for all runs, and setback and gap settings for the die were at 1.2 mm. Also, in a similar manner to runs 6-12 for Samples A7-A9, the compositions were modified by adding 2 wt % of a masterbatch including 30 wt % Erucamide and 70 wt % of Vistamaxx™ 2125 (ExxonMobil). The process conditions for each of the runs is set forth in Table XI. DCD refers to die-to-collector distance.

TABLE XI

| Run No. | Sample | Output GSM | Basis Wt., g/m² | DCD, mm | Air Rate scfm |
|---|---|---|---|---|---|
| 1 | A12 | 0.4 | 70.4 | 198 | 257 |
| 2 | A12 | 0.4 | 70.4 | 248 | 298 |
| 3 | A12 | 0.6 | 70.0 | 248 | 323 |
| 4 | A12 | 0.6 | 70.0 | 299 | 370 |
| 5 | A13 | 0.4 | 69.8 | 198 | 238 |
| 6 | A13 | 0.4 | 69.8 | 248 | 268 |
| 7 | A13 | 0.6 | 69.2 | 248 | 298 |
| 8 | A13 | 0.6 | 69.2 | 299 | 328 |
| 9 | A14 | 0.4 | 70.1 | 198 | 227 |
| 10 | A14 | 0.4 | 70.1 | 248 | 263 |
| 11 | A14 | 0.6 | 69.9 | 248 | 298 |
| 12 | A14 | 0.6 | 69.9 | 299 | 328 |

The tensile properties of the fabrics resulting from Samples A12-A14 are shown in Table XII.

TABLE XII

| | | Fabric Properties | | | |
|---|---|---|---|---|---|
| Run No. | Sample | Peak Load MD (N) | Elongation MD (%) | Peak Load TD (N) | Elongation TD (%) |
| 1 | A12 | 8.3 | 265 | 7.34 | 291 |
| 2 | A12 | 7.4 | 214 | 7.32 | 263 |
| 3 | A12 | 6.7 | 207 | 6.5 | 228 |
| 4 | A12 | 6.9 | 175 | 6.22 | 185 |
| 5 | A13 | 7.5 | 254 | 6.38 | 263 |
| 6 | A13 | 7.2 | 224 | 6.62 | 262 |
| 7 | A13 | 6.7 | 190 | 5.85 | 214 |
| 8 | A13 | 6.1 | 162 | 5.93 | 205 |
| 9 | A14 | 7.3 | 269 | 6.14 | 347 |
| 10 | A14 | 6.3 | 213 | 5.96 | 295 |
| 11 | A14 | 5.7 | 176 | 4.86 | 210 |
| 12 | A14 | 5.5 | 186 | 5.37 | 281 |

Various modifications and alterations that do not depart from the scope and spirit of this invention will become apparent to those skilled in the art. This invention is not to be limited to the illustrative embodiments set forth herein.

What is claimed is:

1. A non-woven fabric made from a composition prepared by combining:
   (a) a first propylene-based elastomer comprising at least 7% by weight mer units derived from ethylene or non-propylene α-olefin;
   (b) a second propylene-based elastomer comprising less than 7% by weight mer units derived from ethylene or non-propylene alpha-olefin; and
   (c) a propylene-based thermoplastic polymer,
where the first and second polypropylene-based elastomers each have a heat of fusion, as determined by DSC, of less than 80 J/g, and where the propylene-based thermoplastic polymer has a heat of fusion, as determined by DSC, equal to or greater than 80 J/g.

2. The non-woven fabric of claim 1, where the first propylene-based elastomer comprises at least 8% by weight mer units derived from ethylene or non-propylene α-olefin, and where the second propylene-based elastomer comprises less than or equal to 6% by weight mer units derived from ethylene or non-propylene α-olefin.

3. The non-woven fabric of claim 2, where the first propylene-based elastomer comprises at least 15 and less than 20% by weight mer units derived from ethylene or non-propylene α-olefin, and where the second propylene-based elastomer comprises at least 3 to less than 6% by weight mer units derived from ethylene or non-propylene α-olefin.

4. The non-woven fabric of claim 1, where the first propylene-based elastomer has an MFR (ASTM D-1238 2.16 kg @ 230° C.) of from about 10 to 60 dg/min, where the second propylene-based elastomer has an MFR (ASTM D-1238 2.16 kg @ 230° C.) of 10 to about 60 dg/min, and where the propylene-based thermoplastic polymer has an MFR (ASTM D-1238 2.16 kg @ 230° C.) of about 3 to about 60 dg/min.

5. The non-woven fabric of claim 1, where the first propylene-based elastomer has an MFR (ASTM D-1238 2.16 kg @ 230° C.) of from about 10 to 60 dg/min, where the second propylene-based elastomer has an MFR (ASTM D-1238 2.16 kg @ 230° C.) of 10 to about 60 dg/min, and where the propylene-based thermoplastic polymer has an MFR (ASTM D-1238 2.16 kg @ 230° C.) of about 20 to about 40 dg/min.

6. The non-woven fabric of claim 1, where the first propylene-based elastomer has an MFR (ASTM D-1238 2.16 kg @ 230° C.) of from about 80 to 150 dg/min, where the second propylene-based elastomer has an MFR (ASTM D-1238 2.16 kg @ 230° C.) of 80 to about 180 dg/min, and where the propylene-based thermoplastic polymer has an MFR (ASTM D-1238 2.16 kg @ 230° C.) of about 3 to about 1,500 dg/min.

7. The non-woven fabric of claim 1, where the first propylene-based elastomer has an MFR (ASTM D-1238 2.16 kg @ 230° C.) of from about 80 to 150 dg/min, where the second propylene-based elastomer has an MFR (ASTM D-1238 2.16 kg @ 230° C.) of 80 to about 150 dg/min, and where the propylene-based thermoplastic polymer has an MFR (ASTM D-1238 2.16 kg @ 230° C.) of about 20 to about 40 dg/min.

8. The non-woven fabric of claim 1, where the first propylene-based elastomer has an MFR (ASTM D-1238 2.16 kg @ 230° C.) of from about 80 to 150 dg/min, where the second propylene-based elastomer has an MFR (ASTM D-1238 2.16 kg @ 230° C.) of 80 to about 150 dg/min, and where the propylene-based thermoplastic polymer has an MFR (ASTM D-1238 2.16 kg @ 230° C.) of about 100 to about 1,500 dg/min.

9. The non-woven fabric of claim 1, where the composition has been vis-broken and has an MFR (ASTM D-1238 2.16 @ 230° C.) of about 60 to about 90 dg/min.

10. The non-woven fabric of claim 1, where the composition has been vis-broken and has an MFR (ASTM D-1238 2.16 @ 230° C.) of about 150 to about 350 dg/min.

11. The non-woven fabric of claim 10, where the non-woven fabric has an elongation in the cross-machine direction of at least 80% or higher.

12. A non-woven fabric made from a composition prepared by combining:
   (a) a low crystallinity propylene-based elastomer having a peak melt temperature of less than 65° C.;
   (b) a high crystallinity propylene-based elastomer having a peak melt temperature less than 120° C.; and
   (c) a propylene-based thermoplastic polymer, where the first and second propylene-based elastomers each have a heat of fusion, as determined by DSC, of less than 80 J/g, and where the propylene-based thermoplastic polymer has a heat of fusion, as determined by DSC, equal to or greater than 80 J/g.

13. The non-woven fabric of claim 12, where the low crystallinity propylene-based elastomer has an MFR (ASTM D-1238 2.16 kg @ 230° C.) of from about 10 to 60 dg/min, where the high crystallinity propylene-based elastomer has an MFR (ASTM D-1238 2.16 kg @ 230° C.) of 10 to about 60 dg/min, and where the propylene-based thermoplastic polymer has an MFR (ASTM D-1238 2.16 kg @ 230° C.) of about 3 to about 60 dg/min.

14. The non-woven fabric of claim 12, where the low crystallinity propylene-based elastomer has an MFR (ASTM D-1238 2.16 kg @ 230° C.) of from about 10 to 60 dg/min, where the high crystallinity propylene-based elastomer has an MFR (ASTM D-1238 2.16 kg @ 230° C.) of 10 to about 60 dg/min, and where the propylene-based thermoplastic polymer has an MFR (ASTM D-1238 2.16 kg @ 230° C.) of about 20 to about 40 dg/min.

15. The non-woven fabric of claim 12, where the low crystallinity propylene-based elastomer has an MFR (ASTM D-1238 2.16 kg @ 230° C.) of from about 80 to 150 dg/min, where said high crystallinity propylene-based elastomer has an MFR (ASTM D-1238 2.16 kg @ 230° C.) of 80 to about 180 dg/min, and where the propylene-based thermoplastic polymer has an MFR (ASTM D-1238 2.16 kg @ 230° C.) of about 3 to about 1,500 dg/min.

16. The non-woven fabric of claim 12, where the low crystallinity propylene-based elastomer has an MFR (ASTM D-1238 2.16 kg @ 230° C.) of from about 80 to 150 dg/min, where the high crystallinity propylene-based elastomer has an MFR (ASTM D-1238 2.16 kg @ 230° C.) of 80 to about 150 dg/min, and where the propylene-based thermoplastic polymer has an MFR (ASTM D-1238 2.16 kg @ 230° C.) of about 20 to about 40 dg/min.

17. The non-woven fabric of claim 12, where the low crystallinity propylene-based elastomer has an MFR (ASTM D-1238 2.16 kg @ 230° C.) of from about 80 to 150 dg/min, where said high crystallinity propylene-based elastomer has an MFR (ASTM D-1238 2.16 kg @ 230° C.) of 80 to about 150 dg/min, and where the propylene-based thermoplastic polymer has an MFR (ASTM D-1238 2.16 kg @ 230° C.) of about 100 to about 1,500 dg/min.

18. The non-woven fabric of claim 12, where the composition has been vis-broken and has an MFR ASTM D-1238 2.16 @ 230° C.) of about 60 to about 90 dg/min.

19. The non-woven fabric of claim 12, where the composition has been vis-broken and has an MFR ASTM D-1238 2.16 @ 230° C.) of about 150 to about 350 dg/min.

20. The non-woven fabric of claim 19, where the non-woven fabric has an elongation in the cross-machine direction of at least 80% or higher.

21. A method for forming a non-woven fabric, the method comprising:
  extruding a propylene-rich composition into fibers and optionally weaving and bonding the fibers, where the propylene-rich composition is prepared by combining a solution including a first propylene-based elastomer with a solution including a second propylene-based elastomer to form a blended solution of the first propylene-based elastomer and the second propylene-based elastomer;
  combining the blend of the first and second propylene-based elastomers with a propylene-based thermoplastic polymer to form a propylene-rich composition; and
  optionally vis-breaking the propylene-rich composition, where the first propylene-based elastomer comprises at least 7% by weight mer units deriving from ethylene or non-propylene α-olefin, where the second propylene-based elastomer comprises less than 7% mer units deriving from ethylene or non-propylene α-olefin, and where the first and second polypropylene-based elastomers each have a heat of fusion, as determined by DSC, of less than 80 J/g, and where the propylene-based thermoplastic polymer has a heat of fusion, as determined by DSC, equal to or greater than 80 J/g.

* * * * *